CONSTANT VELOCITY UNIVERSAL JOINT

Original Filed Oct. 23, 1965 4 Sheets-Sheet 1

INVENTOR.
EVERETT H. SHARP
BY
Barnes, Kisselle, Raisch & Choate
ATTORNEYS

CONSTANT VELOCITY UNIVERSAL JOINT

Original Filed Oct. 23, 1965 4 Sheets-Sheet 2

INVENTOR.
EVERETT H. SHARP

BY
Barnes, Kisselle, Raisch & Choate
ATTORNEYS

CONSTANT VELOCITY UNIVERSAL JOINT

Original Filed Oct. 23, 1965 4 Sheets-Sheet 3

INVENTOR.
EVERETT H. SHARP
BY
Barnes, Kisselle, Raisch & Choate
ATTORNEYS

CONSTANT VELOCITY UNIVERSAL JOINT

Original Filed Oct. 23, 1965 4 Sheets-Sheet 4

INVENTOR.
EVERETT H. SHARP
BY
Barnes, Kisselle, Raisch & Choate
ATTORNEYS

United States Patent Office

Re. 26,691
Reissued Oct. 14, 1969

26,691

CONSTANT VELOCITY UNIVERSAL JOINT

Everett H. Sharp, 344 E. Maryknoll,
Rochester, Mich. 48063

Original No. 3,333,440, dated Aug. 1, 1967, Ser. No. 504,003, Oct. 23, 1965. Application for reissue Mar. 27, 1968, Ser. No. 724,311
Int. Cl. F16d *3/34*
U.S. Cl. 64—21 36 Claims

Matter enclosed in heavy brackets [ ] appears in the original patent but forms no part of this reissue specification; matter printed in italics indicates the additions made by reissue.

*ABSTRACT OF THE DISCLOSURE*

*A universal joint incorporating a driving member, a driven member, torque transmitting means between the driving and driven members preferably comprising a plurality of members having substantially spherical surfaces contacting the driving and driven members, and pilot means which insure proper positioning of the torque transmitting members relative to the driving and driven members.*

This invention relates to universal joints and particularly to universal joints of the type wherein there is a substantially constant angular velocity transfer of motion from a driving to a driven member, commonly referred to as constant velocity universal joints.

Among the objects of the invention are to provide a universal joint which has substantially constant velocity characteristics; which operates under severe torque loading and angularity conditions without excessive heat or wear; wherein the parts have substantially rolling motion with respect to one another; wherein the torque transmitting parts and piloting parts are not severely stressed, are not wedged, and are not subjected to high instantaneous forces; wherein the joint incorporates a plurality of torque transmitting members and the load on some of the torque transmitting members can be relieved as is desired during certain movements of the joint; wherein the driving and driven member can telescope relative to one another if required and wherein an axially urging force can be achieved between the driving and driven members if desired; which is easy to manufacture and which is simple in design requiring a minimum number of parts.

Basically, the universal joint embodying the invention incorporates a driving member, a driven member, torque transmitting means between the driving and driven member preferably comprising a plurality of members having substantially spherical surfaces contacting the driving and driven members, and pilot means which insure proper positioning of the torque transmitting members relative to the driving and driven members.

Figure 1:
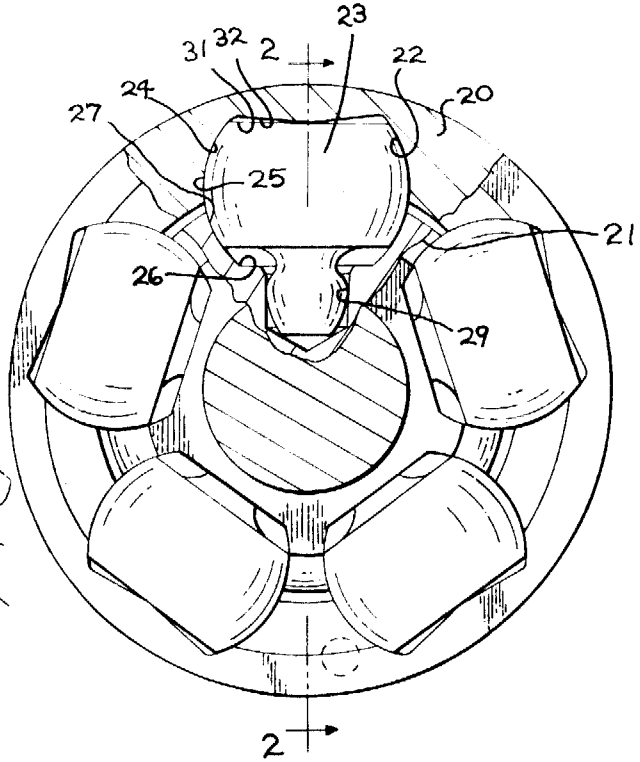
FIG. 1 is a part sectional end view of a universal joint embodying the invention.
Figure 2:
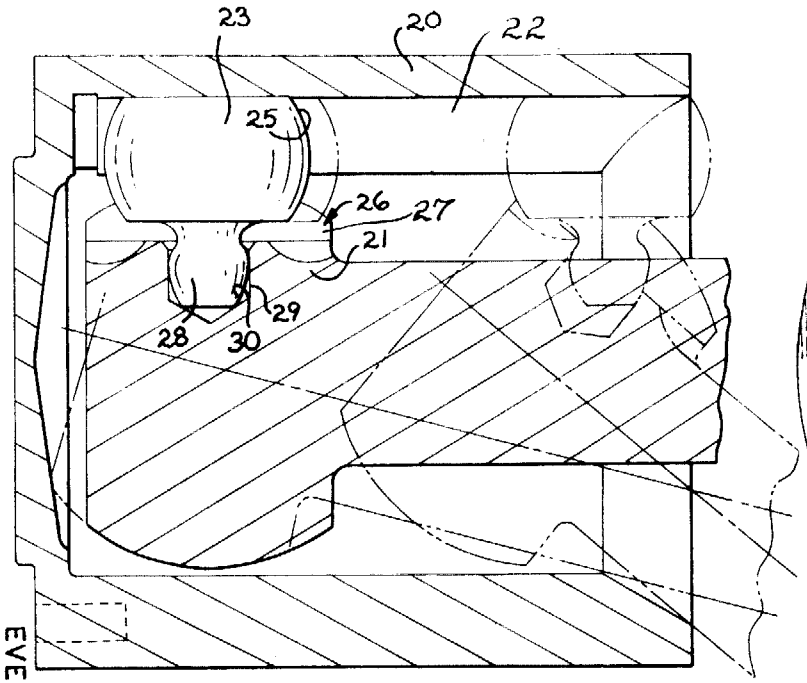
FIG. 2 is a fragmentary longitudinal sectional view taken along the line 2—2 in FIG. 1.

Referring to FIGS. 1 and 2, the universal joint embodying the invention comprises an outer race 20 and an inner race 21. As is well known in connection with the use of universal joints, either of the races may be driving or driven members in accordance with the use to which the universal joint is put. The outer member 20 is provided with axially extending circumferentially spaced grooves 22 on the inner surface thereof in which combined torque transmitting and pilot members 23 are positioned. As shown in FIG. 1, the sides of the grooves 22 have cylindrical surfaces 24 that are engaged by a spherical surface 25 on the member 23. The inner race 21 is provided with oppositely disposed axially extending grooves 26, the sides 27 of which are cylindrical and contact the spherical surfaces 25 of the torque transmitting members 23.

The torque transmitting members 23 include integral radially extending pilot projections 28 that extend into radially extending cylindrical sockets 29 in the base of each groove 26. The surface 30 of the radial projection 28 constitutes a figure of revolution and is so designed that it remains in contact with the side of the socket 29 throughout the angular movement of the inner race 21 relative to the outer race 20.

Figure 3:
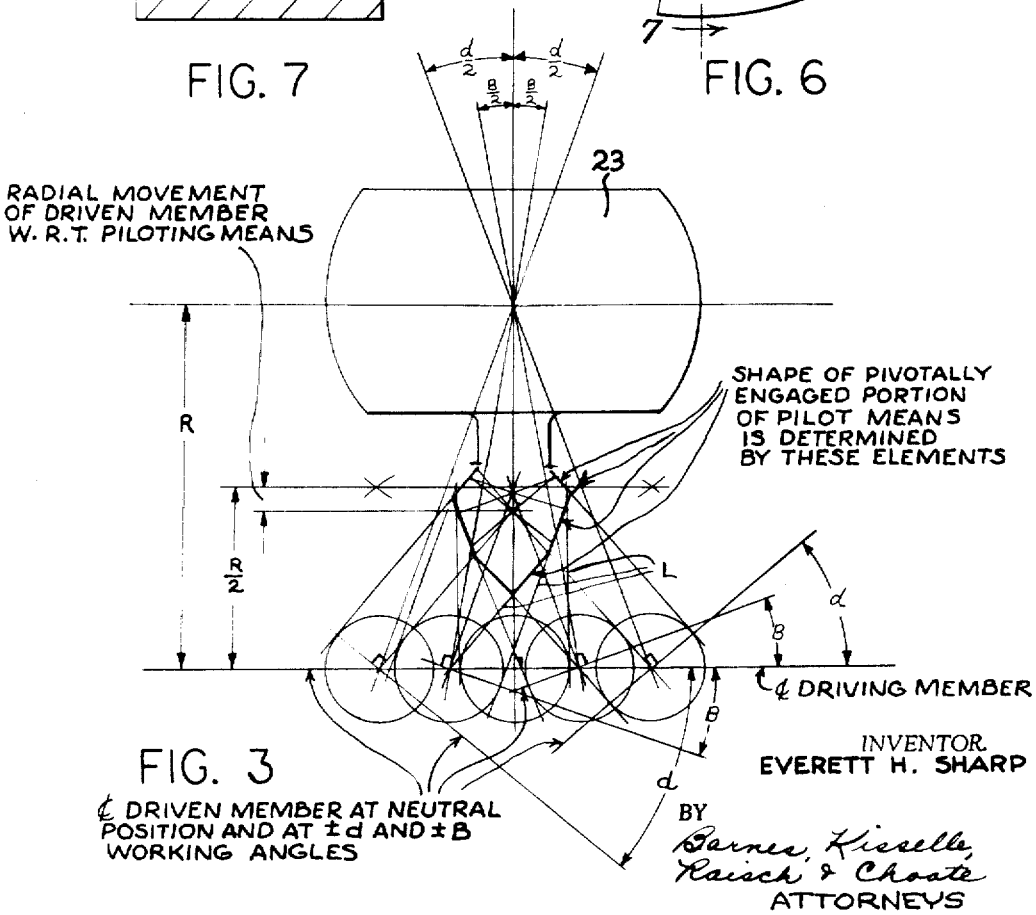
FIG. 3 is a diagrammatic view showing the design of certain of the parts of the universal joint.

One method in which this surface 30 is developed can be more readily understood by referring to FIG. 3. Specifically, the torque transmitting member 23 is maintained in fixed position while moving the surfaces of the sockets through a range of operating positions as represented by the angles $\alpha$ and $\beta$ which correspond to successive angular positions of the outer and inner races. Since it is known that it is desired to move the relative position of the torque transmitting member 23 through a half angle with respect to the angular movement of the inner race to the outer race, successive lines L can be drawn corresponding to successive positions of the engaging surface of socket 29. By joining these lines, a profile is developed which may be rotated about the axis of the torque transmitting member to produce a surface of revolution that produces the desired shape that radial projection 28 should have with respect to the cylindrical socket. As shown in FIG. 3, during the angular movement of the inner race and the outer race, there is relative radial movement as well as pivotal movement between the pilot projection and its socket.

As an alternative procedure, the shape of the socket might arbitrarily have been taken as a cylinder, the shape of the pilot projection might have been taken as a sphere, and a layout made to determine the point of initial engagement (corresponding to R/2 in FIG. 3) which most nearly satisfies the requirement of maintaining the torque transmitting member in the homokinetic plane. It has been demonstrated that this simpler approach achieves workable accuracy over a wide range of angular operating conditions.

It will be readily understood that in the event that the shape of the sockets is changed, a difference shape of the surface on the projection will be developed in a similar fashion. Thus, the projection and socket can take on various shapes such as involute, cycloidal or spherical. Further, it can be readily understood that the position of the socket and the radial projection can be reversed so that the socket is in torque transmitting member 23 and the radial projection is on the inner race.

In addition, as shown in FIGS. 1 and 2, the base surface 31 of each torque transmitting member 23 is flat. The base surface 31 is made flat in order to provide significant axial engagement of the surface with the base 32 of the outer race groove. This cooperates with the inner race surface 27 and surface 25 to maintain an axial non-pivoting sliding relationship between the torque transmitting member and the outer race.

Figures 4, 5:
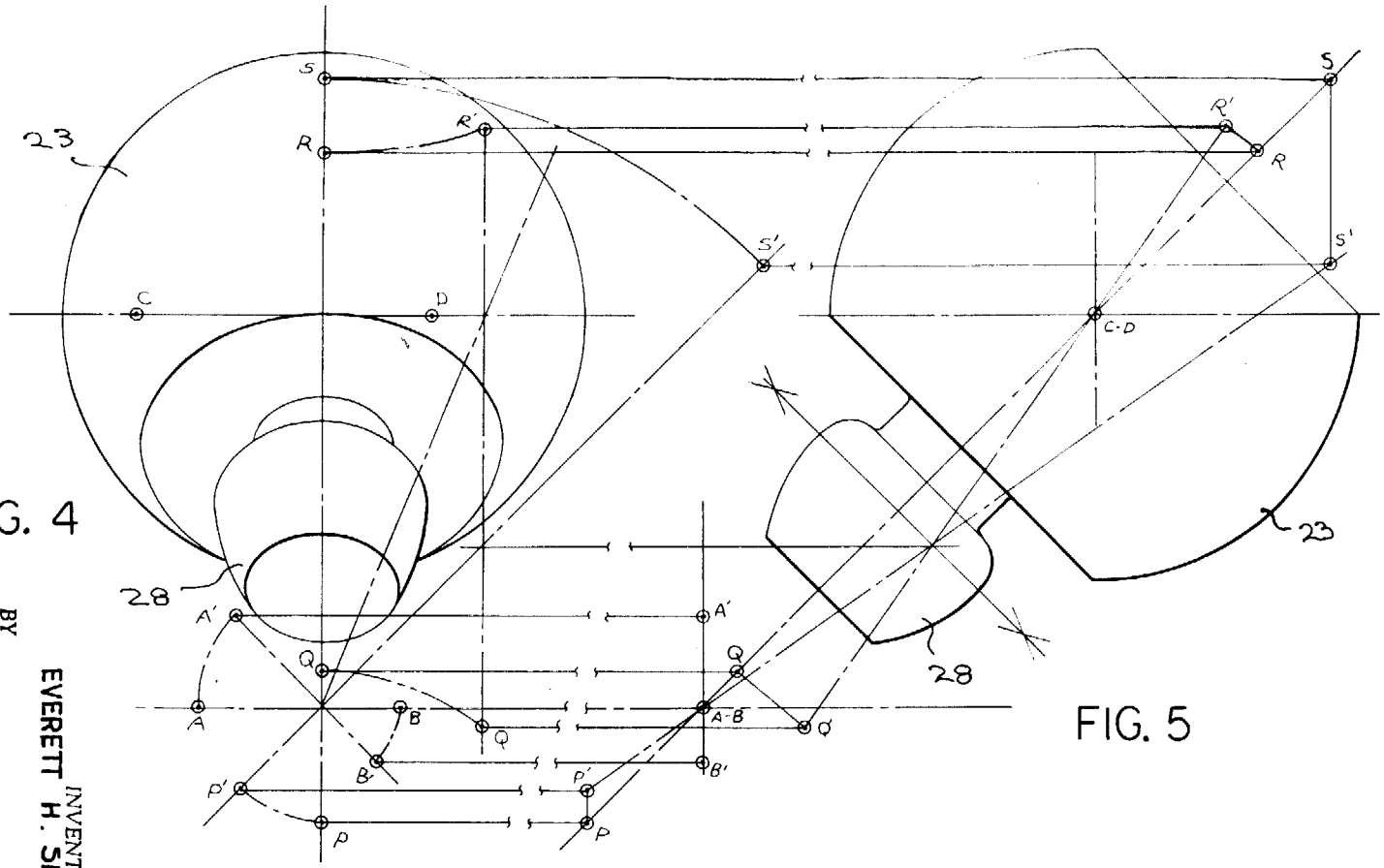
FIGS. 4 and 5 are diagrammatic views showing the movements of certain parts of the universal joint.

The base 32 of each groove 24 tapers outwardly from a longitudinal plane bisecting the groove so that there is a permissible pivotal movement of the torque transmitting member 23 relative to the outer race 20 in a circumferential or transverse radial plane. The necessity of having such a pivotal movement in the circumferential direction can be readily understood by referring to FIGS. 4 and 5. Consider line A–B as the axis of the driven member 21; line C–D, the axis of a surface on the drive member 20 which drivingly engages the intermediate torque transmitting members 23; line P–S, the axis of a surface of the driven member 21 which engagees the pilot projection 28; and line Q–R, the axis of the pilot projection 28. The joint is positioned so that P–Q and R–S are oblique to and A–B and C–D parallel to the viewing plane in FIG. 4. In these figures, the actual driving and driven members are not shown; their shape may be as shown in FIGS. 1 and 2. Now, if A–B rotates to A′–B′ so that P–S rotates to P′–S′ and Q–R slides to Q′–R′, it is noted that the line P–S in FIG. 5 has an apparent rotation in the viewing plane. This rotation causes a corresponding counter-rotation of Q–R to Q′–R′ or, as stated above, a pivotal motion of the pilot projection 28 with respect to the driving member 20.

Figure 7:
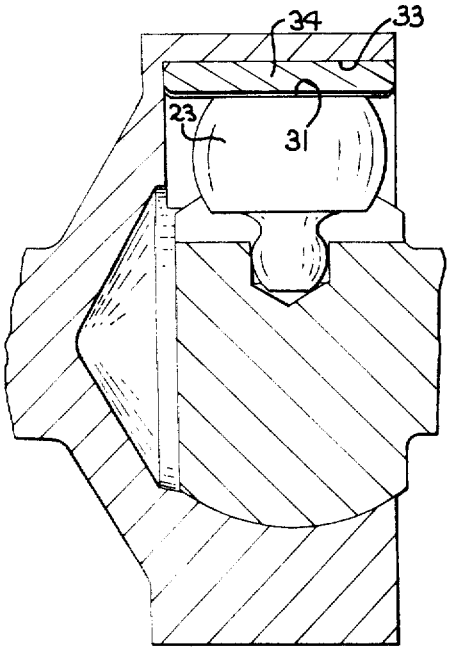
FIG. 7 is a fragmentary sectional view taken along the line 7—7 in FIG. 6.
Figure 6:
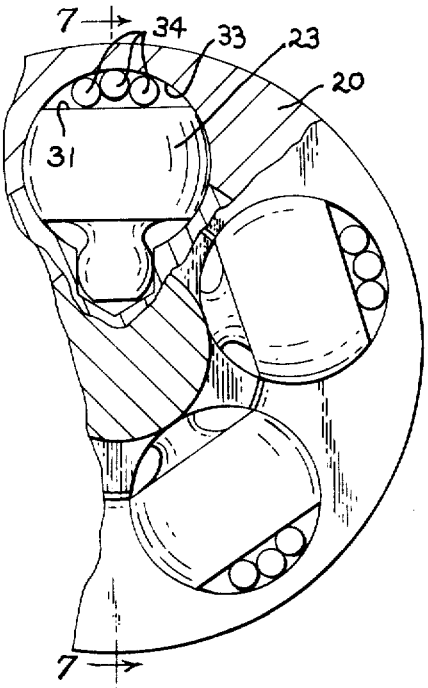
FIG. 6 is a fragmentary part sectional end view of a modified form of universal joint.

In the form of the invention shown in FIGS. 6 and 7, the permitted movement in the circumferential direction is achieved by making the base surface 33 of the grooves 22 in the outer race such that they are also cylindrical as are the sides 24 of the grooves and filling the space between the base 33 and the flat 31 of each torque transmitting member 23 with a plurality of cylindrical rollers 34 so that there is permissible pivotal movement in a circumferential direction. It can be appreciated that this form of the invention facilitates manufacture of the universal joints since the cylindrical grooves 22 can be formed in the outer race 20 in a single operation and without any special taper as is required in the form shown in FIGS. 1 and 2.

Figure 9:
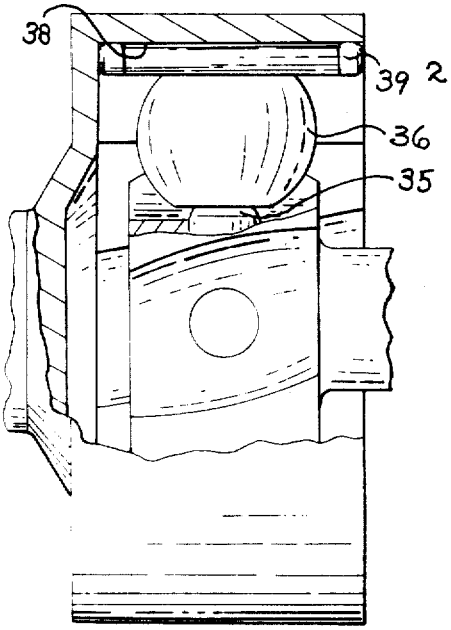
FIG. 9 is a fragmentary part sectional side view of the joint shown in FIG. 8.
Figure 8:
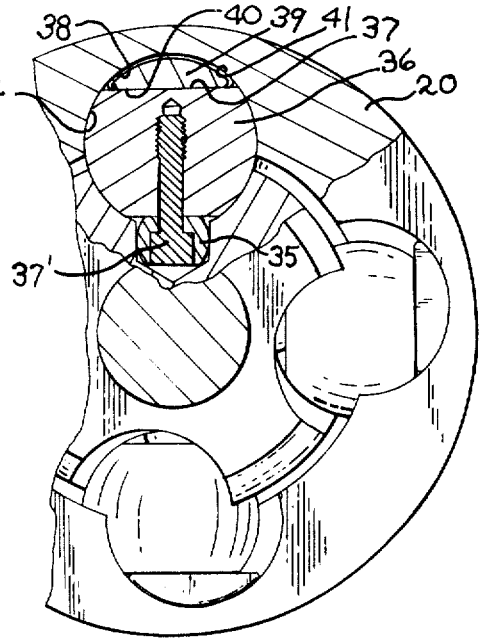
FIG. 8 is a fragmentary part sectional end view of a further modified form of universal joint.

In the form of the invention shown in FIGS. 8 and 9, the radial projection 35 is a separate member retained on the torque transmitting member 36 by a screw 37′. The circumferential motion of the torque transmitting members in this form of the invention is achieved by making the base of the torque transmitting members flat as at 37, the base of each groove in the outer member 20 cylindrical as as 38 and then filling the space by a sector shaped element 39 having a flat surface 40 and a cylindrical surface 41.

Figure 11:
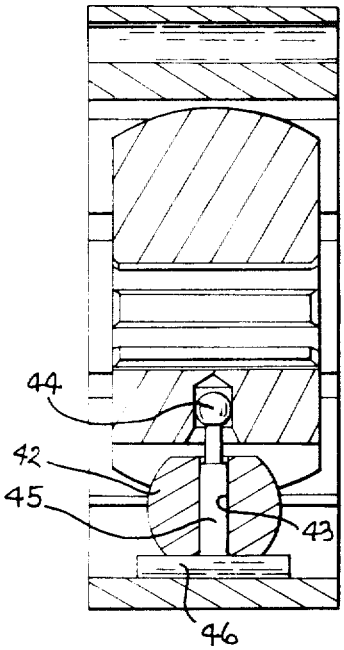
FIG. 11 is a fragmentary sectional view taken along the line 11—11 in FIG. 10.
Figure 10:
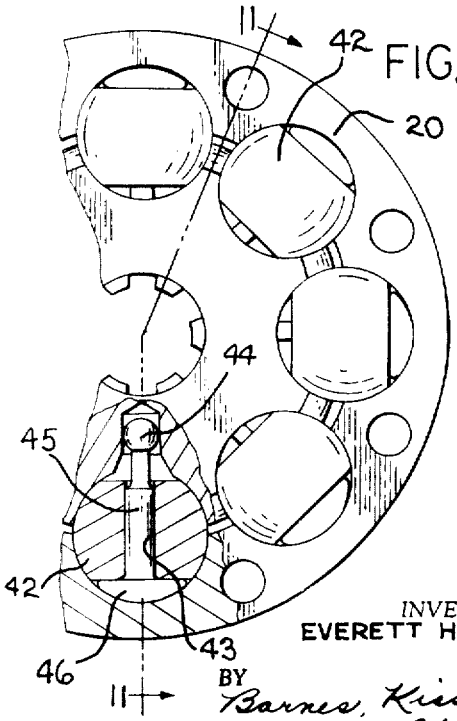
FIG. 10 is a fragmentary part sectional end view of a further modified form of universal joint.

In the form of the invention shown in FIGS. 10 and 11, the torque transmitting members 42 have radial cylindrical openings 43 extending therethrough and the radial projection 44 similar in configuration to that shown in FIGS. 1 and 2 includes an extension 45 whereby it is integrally connected to an insert 46 similar to the insert 39 in FIGS. 8 and 9. Thus, the radial projection, extension 45 and insert 46 form as a unit the pilot member that serves the dual function of providing the desired axial movement of the torque transmitting members relative to the inner and outer race and permitting pivotal or circumferential movement relative to the outer race.

Instead of providing an extension which extends through the torque transmitting member, the extension may surround the torque transmitting member in the form of a pair of arms extending outwardly for engagement with a suitable surface of the outer race and a stem extending inwardly to form the pilot projection which engages the socket. In such a case, the torque transmitting member may comprise a simple ball.

In each of the forms of the invention, since there is a radial projection for each of the torque transmitting members, it is possible by properly shaping the contacting surface of the radial projection to permit a relieving of the forces on certain of the torque transmitting members. Thus, as is well known, as the joint rotates, the driving members move back and forth in their respective grooves which reversal points in their groove travel occurring twice per revolution. These reversal points are frequently points of wear and heat generation. At these reversal points, the torque transmitting members must be forcibly returned to their correct position. If a small clearance is allowed at these reversal points by removing appropriate portions of the surface on the pilot projections, then the forces required to pass through the reversal points can be greatly reduced. Thus, by properly shaping the contacting surfaces of the radial projections, it is possible to relieve the forces on some of the torque transmitting members at certain times during their rotation, as for example, when the torque transmitting members reverse their direction of travel with respect to the driving and driven members; when the surfaces of the driving and driven members are both severely misaligned; or when there are excessive forces on the torque transmitting members.

As shown in FIG. 2, by providing the outer grooves 24 with substantial length, it is possible to create a joint wherein the inner race 21 can move or telescope with respect to the outer race 20 so that the universal joint can be used in applications where such a telescoping motion is required. Conversely, by providing suitable engaging surfaces between the driving and driven members, as shown in FIGS. 6 and 7, such axial movement can be prevented.

As shown in FIGS. 8 and 9, mating grooves may be skewed with respect to each other. This construction is sometimes beneficial if an axially urging force is desired between the driving and driven members, or if it is desired to have groove crossing action assist in positioning the torque transmitting elements. The center lines of the skewed grooves may be straight, helical, circular, or of certain other forms; any one or more of the pairs of grooves may be skewed while others are not skewed; certain pairs of grooves may be skewed oppositely from other pairs; and certain pairs may be skewed to a greater or lesser degree than other pairs in the same joint. It is necessary, though, that each groove be a mirror image of its mate i.e., symmetrical about a homokinetic plane.

Although the figures show torque transmitting means with spherical surfaces of equal radius engaging both the inner and outer races, these radii need not be equal as long as they are concentric. For example, for certain applications it might be desirable to make the outer spherical portion of the torque transmitting member larger so as to permit a larger flat piloting surface for longer, more stable engagement of the outer race groove or insert, and consequently lower engaging forces. Also, within certain limits, making the outer spherical radius of the torque transmitting member larger than the inner spherical radius tends to reduce the amount of sliding between the torque transmitting members and the outer and inner races.

I claim:

1. In a universal joint, the combination comprising
a driving member,
a driven member,
intermediate torque transmiting means between the driving member and the driven member,
and pilot means between the torque transmitting member and the driving member and between the torque transmitting member and the driven member,
said pilot means having pivotal movement relative to one of said members and substantially no pivotal movement axially and limited movement circumferentially relative to the other of said members.

2. The combination set forth in claim 1 wherein said torque transmitting means comprises a member having substantially spherical surfaces, said driving and driven members having contacting surfaces engaging said spherical surfaces.

3. The combination set forth in claim 1 wherein siad pilot means comprises a member having a surface of revolution.

4. The combination set forth in claim 1 wherein said intermediate torque transmitting means and said pilot means comprise members having surfaces of revolution about a common axis.

5. The combination set forth in claim 1 wherein said torque transmitting means and said pilot means comprises a single member.

6. The combination set forth in claim 1 wherein said torque transmitting means and said pilot means have unrestrained rotary motion relative to one another.

7. The combination set forth in claim 1 wherein there is permissible sliding movement between the pilot means and the one said member.

8. The combination set forth in claim 1 wherein said torque transmitting means comprises a plurality of circumferentially spaced members, one of said driving and driven members comprising an outer race, the other of said driving and driven members comprising an inner race, said outer race having grooves therein extending substantially axially thereof, each of said torque transmitting members having a substantially spherical surface engaging its respective groove, said inner member having a plurality of grooves therein extending substantially axially thereof, each said torque transmitting member having a substantially spherical surface engaging its respective groove in said inner member.

9. The combination set forth in claim 8 wherein said pilot means includes a socket in one of said torque transmitting members and said inner race and a projection on the other of said torque transmitting member and said inner race extending into said socket.

10. The combination set forth in claim 9 wherein said pilot means includes means for permitting relative pivotal movement of said torque transmitting members with respect to said outer race in a radial plane.

11. The combination set forth in claim 10 wherein there is permissible sliding movement between the pilot means and the inner race.

12. The combination set forth in claim 10 wherein said last-mentioned means comprises clearances between the base of said groove and said torque transmitting member.

13. The combination set forth in claim 10 wherein said last-mentioned means comprises a plurality of rollers in the base of each said groove in said outer race.

14. The combination set forth in claim 10 wherein said last-mentioned means comprises a member in the base of each groove in said outer race, said member, said outer race and said torque transmitting members having complementary surfaces permitting said pivotal movement in a radial plane.

15. The combination set forth in claim 10 wherein each said pilot means comprises a member having a portion extending through said torque transmitting member and integral with said radial projection, the radially outermost portion of said pilot member slidably engaging the base of its respective groove in the outer member to permit limited pivotal movement of said pilot member in a radial plane.

16. The combination set forth in claim 9 wherein said projection has a substantially spherical surface engaging said socket.

17. The combination set forth in claim 9 wherein the contacting surfaces of said socket and said projection are such that the load on some of said torque transmitting members is relieved when the torque transmitting members reverse their direction of travel with respect to the driving and driven members.

18. The combination set forth in claim 9 wherein the shape of the contacting surfaces of said socket and said pilot member in such that the load on the torque transmitting members is relieved when there is excessive misalignment between the grooves of the outer and inner members.

19. The combination set forth in claim 9 wherein the shape of the contacting surfaces of the socket and pilot member is such that the load on the torque transmitting members is relieved when they are passing through zones which would otherwise require excessive forces upon the pilot member or torque transmitting member.

20. In a universal joint, the combination comprising an outer race, an inner race, a plurality of intermediate torque transmitting members, said outer race having substantially axially extending grooves on the inner surface thereof, each said torque transmitting member having a first spherical surface portion engaging its respective groove, said inner race having a plurality of substantially axially extending grooves in juxtaposed relation with the grooves of said outer race, each said torque transmitting member having a second spherical surface portion engaging the sides of its respective said groove in said inner race, one of said inner race and said torque transmitting member having a socket therein, the other of said inner race and said torque transmitting member having a radial projection thereon, said socket and said projection having contacting surfaces permitting pivotal movement of said inner race about an angle to the axis of the outer race, and means between each torque transmitting member and the base of its respective groove in the outer race providing for limited pivotal movement of said torque transmitting members in a circumferential direction relative to said outer race.

21. The combination set forth in claim 20 wherein said last-mentioned means comprises substantially flat surfaces on said torque transmitting members, the base of said groove having surface portions tapering outwardly toward the periphery thereby permitting limited pivotal movement of said torque transmitting members in a radial plane.

22. The combination set forth in claim 20 wherein said last-mentioned means comprises substantially flat surfaces on said torque transmitting members adjacent the base of each said groove in said outer race, said grooves in said outer race being substantially cylindrical, and a plurality of roller members interposed between the base of each torque transmitting member and the base of said groove.

23. The combination set forth in claim 20 wherein said last-mentioned means comprises a substantially flat surface on the base of each torque transmitting member, the grooves in said outer race being substantially cylindrical in cross section, and an insert substantially filling the space between the base of each said torque transmitting member and the base of its respective groove.

24. The combination set forth in claim 23 wherein said last-mentioned means includes an extension connecting the radial projection and the insert member.

25. The combination set forth in claim 20 wherein said radial projection and said torque transmitting member are an integral unit.

26. The combination set forth in claim 20, wherein said sockets are in said inner race and said radial projections are on said torque transmitting members.

27. The combination set forth in claim 20 wherein said projection and said socket are so dimensioned so that there is permissible sliding action therebetween.

28. The combination set forth in claim 20 including means for preventing pivotal movement in an axial direction between the torque transmitting members and the grooves of the outer race.

29. In a universal joint, the combination comprising
a driving member,
a driven member,
intermediate torque transmitting means between the driving member and the driven member,
and pilot means between the torque transmitting member and the driving member and between the torque transmitting member and the driven member,
said pilot means having pivotal movement relative to one of said members and substantially no pivotal movement axially and limited movement circumferentially relative to the other of said members,
said pilot means including a socket in one of said one member and said torque transmitting members and a projection in the other of said one member and said torque transmitting members,
said projection having a substantially spherical contacting surface,
said torque transmitting members having substantially spherical contacting surfaces.

*30. In a universal joint, the combination comprising*
*a driving member,*
*a driven member,*
*intermediate torque transmitting means between the driving member and the driven member,*
*and pilot means between the torque transmitting means and driving member and between the torque transmitting means and the driven member,*
*said pilot means maintaining the axis of both said torque transmitting means and said pilot means in a plane perpendicular to the axis of one of said members and permitting limited circumferential movement of said axis of said torque transmitting means and said pilot means circumferentially with respect to the other of said members.*

*31. The combination set forth in claim 30 wherein said torque transmitting means comprises a member having substantially spherical surfaces,*
*said driving and driven members having contacting surfaces engaging said spherical surfaces.*

*32. The combination set forth in claim 31 wherein said intermediate torque transmitting means and said pilot means comprise members having surfaces of revolution about a common axis.*

*33. The combination set forth in claim 30 wherein said torque transmitting means comprises a plurality of circumferentially spaced members,*
*one of said driving and driven members comprising an outer race,*
*the other of said driving and driven members comprising an inner race,*
*said outer race having grooves therein extending substantially axially thereof,*
*each of said torque transmitting members having a substantially spherical surface engaging its respective groove,*

*said inner member having a plurality of grooves therein extending substantially axially thereof,*
*each said torque tarnsmitting member having a substantially spherical surface engaging its respective groove in said inner member.*

*34. In a universal joint, the combination comprising*
*a driving member,*
*a driven member,*
*intermediate torque transmitting means between the driving member and the driven member,*
*first and second pilot means movable with said torque transmitting means,*
*first and second cooperating pilot means on said driving and driven members, respectively,*
*said pilot means cooperating to maintain the axis of said torque transmitting means and said first and second pilot means in a plane perpendicular to the axis of one of said members and to permit circumferential movement of said axis of said torque transmitting means and said first and second pilot means relative to the other of said members.*

*35. The combination set forth in claim 34 wherein said torque transmitting means comprises a plurality of circumferentially spaced members,*
*one of said driving and driven members comprising an outer race,*
*the other of said driving and driven members comprising an inner race,*
*said outer race having grooves therein extending substantially axially thereof,*
*each of said torque transmitting members having a substantially spherical surface engaging its respective groove,*
*said inner member having a plurality of grooves therein extending substantially axially thereof,*
*each said torque transmitting member having a substantially spherical surface engaging its respective groove in said inner member.*

*36. The combination set forth in claim 35 wherein said pilot means includes a socket in one of said torque transmitting members and said inner race and a projection on the other of said torque transmitting member and said inner race extending into said socket.*

References Cited

The following references, cited by the Examiner, are of record in the patented file of this patent or the original patent.

UNITED STATES PATENTS

| | | | |
|---|---|---|---|
| 2,354,961 | 8/1944 | O'Donnell | 64—8 |
| 2,902,844 | 9/1959 | Rzeppa | 64—21 |
| 2,908,151 | 10/1959 | Wahmark | 64—21 |
| 3,106,077 | 10/1963 | Sharp | 64—21 |
| 3,187,520 | 6/1965 | Rzeppa | 64—21 |
| 2,354,961 | 8/1944 | O'Donnell | 64—8 |
| 2,902,844 | 9/1959 | Rzeppa | 64—21 |
| 2,908,151 | 10/1959 | Wahlmark | 64—21 |
| 3,106,077 | 10/1963 | Sharp | 64—21 |
| 3,187,520 | 6/1965 | Rzeppa | 64—21 |

HALL C. COE, Primary Examiner